United States Patent [19]
Frahm

[11] Patent Number: 5,918,798
[45] Date of Patent: Jul. 6, 1999

[54] RE-USABLE COMPACT SELF-CONTAINABLE COLLAPSIBLE CONTAINER

[76] Inventor: Paul D. Frahm, 804 East Old Willow Rd. #108, Prospect Heights, Ill. 60070

[21] Appl. No.: 08/747,754

[22] Filed: Nov. 13, 1996

[51] Int. Cl.⁶ ............................................. B65D 5/36
[52] U.S. Cl. .................... 229/117.07; 280/33.992
[58] Field of Search ......................... 229/117.07, 117.16; 280/288.4, 33.992; 224/411, 906

[56] References Cited

U.S. PATENT DOCUMENTS

| | | |
|---|---|---|
| 728,749 | 5/1903 | McCord . |
| 2,998,181 | 8/1961 | Chasolen . |
| 3,028,066 | 4/1962 | Bumby ............................... 280/33.992 |
| 3,376,994 | 4/1968 | Flinn, Jr. ............................. 229/117.07 |
| 3,850,362 | 11/1974 | Stollberg et al. . |
| 4,006,670 | 2/1977 | Royal . |
| 4,014,292 | 3/1977 | Coughlin et al. . |
| 4,358,049 | 11/1982 | Kupersmit . |
| 4,560,096 | 12/1985 | Lucas et al. ......................... 280/33.992 |
| 4,709,852 | 12/1987 | Stoll . |
| 4,871,100 | 10/1989 | Posner ................................. 280/33.992 |
| 5,325,602 | 7/1994 | Nainis et al. . |
| 5,467,916 | 11/1995 | Beales . |
| 5,472,107 | 12/1995 | Lieber . |
| 5,494,308 | 2/1996 | Southerland ........................ 280/33.992 |

Primary Examiner—Gary E. Elkins
Attorney, Agent, or Firm—Meroni & Meroni

[57] ABSTRACT

A re-usable compact self-containable collapsible container comprising a substantially rectangular base and four substantially rectangular walls having parallel sides and parallel ends. The sides and ends are foldably joined to a perimeter of the base opposite each other respectively. Each side is foldably joined end-to-end with adjacent ends and each end is foldably joined end-to-end with adjacent sides. Each side is foldably divided into three segments along lines extending approximately a 45 degree angle from a corner toward approximately a center of the side. The three segments comprise a center segment foldably joined to two outer segments where an outer segment base length is approximately equal to one-half of a center segment base length. The sides and ends cooperatively form an open mouth of the container substantially co-extensive with the perimeter of the base when the container is in an expanded position. A first side of the sides is foldable inwardly toward a second side of the sides, the first side of the sides being positionable over the second side of the sides with both first and second sides being positionable over the base. The ends are foldable inwardly toward each other over the sides and over the base without overlapping each other. Each side and end is substantially parallel to each other side and end and the base and the sides and ends are substantially contained within the perimeter of the base when the container is in a collapsed position.

20 Claims, 6 Drawing Sheets

Occupies less than 5% of cart space

RE-USABLE COMPACT SELF-CONTAINABLE COLLAPSIBLE CONTAINER

BACKGROUND OF THE INVENTION

1. Field of the Invention

The present invention relates generally to a collapsible container made of a flexible sheet material. More specifically, my invention relates to my Re-usable Compact Self-Containable Collapsible Container uniquely sized for maximizing the storage capacity of a standard push-type shopping cart structure. Also, my collapsible container can be preferably constructed from a unitary blank, which blank comprises an economical flexible sheet material such as cardboard or corrugated cardboard. My container is useable for carrying groceries, packaged articles, goods or the like alone and in combination with a standard push-type shopping cart. In an expanded position, my container maximizes the storage capacity of the collapsible container while simultaneously providing container walls of sufficient rigidity to both maintain the container in an expanded condition as well as enable a second three collapsible containers in the expanded condition to be stacked on top of a first three expanded collapsible containers. Further, preparatory to using the container to carry groceries or after it has been used to carry groceries, the container can be easily and compactly stored in a flat collapsed condition enabling several collapsed containers to be stacked next to each other in a stable vertical or horizontal relationship.

2. Description of the Prior Art

A multitude of collapsible container structures are known in the art, however such structures are costly, inconvenient and inefficient for use as a grocery carrying container alone or in combination with a standard push-type shopping cart. With businesses becoming more cost conscious and unwilling to provide the simple conveniences that they used to at no additional cost to the customer, the customer is left to fend for him or her self. In particular, today many grocery stores or the like do not provide carrying containers to their customers free of charge. If they do provide containers, the containers are often a flimsy type of bag. These bags are very inconvenient and unreliable for transporting such items as small canned goods combined with large juice containers combined with frozen goods, which during the summer months sweat and weaken a paper bag to the breaking point, combined with other heavy or bulky goods. Additionally, containers other than bags, if provided by grocery stores, whether for a cost or free of charge, are often bulky or too large to be manageable for one person and they do not maximize the storage capacity of the carrying container while also maximizing the storage capacity of the shopping cart.

Thus, if a customer desires to carry their groceries out of the store in some kind of reliable container a grocery store customer must bring their own carrying containers into the grocery store or at least in their vehicle with them to the store. Based on my experience, the most convenient and time saving way to go grocery shopping is to bring the desired number of compact self-containable collapsible containers needed into the grocery store where they can be carried in a shopping cart while one shops. Then, once one has purchased goods, the collapsible containers are readily available and can be used to quickly and easily filled with the purchased groceries. Now, the filled collapsible containers in the shopping cart can be easily wheeled to a waiting vehicle and the filled collapsible containers are quickly and easily loaded into the vehicle. Moreover, my collapsible container is preferably sized for a fitted relationship inside the shopping cart to simultaneously: (i) maximize the storage capacity of the shopping cart, (ii) utilizing the fewest number of collapsible containers, while also (iii) providing a collapsible container of sufficient size to carry a good number of grocery items yet not being too big and bulky that one person could not carry the filled container. Finally, once one arrives home, the groceries are still in the filled collapsible containers and now the collapsible containers can be easily transported by one person, one at a time, into the house or wherever desired.

As a result of the convenience requirement that one must bring the collapsible containers into the grocery store with them, the containers must be self-contained and compactly storable in the shopping cart without taking up much of the valuable shopping cart space that is needed for groceries. The unique configuration and features of my collapsible container described and claimed herein meet these requirements, including without limitation providing not only hinge lines or foldably joined parts but also double-jointed hinges for foldability of said parts. For example, in one such shopping cart that I have experimented with, three collapsed containers in the collapsed position occupy less than 5% of the overall top cart space and can even be placed on a bottom rack of the cart, if desired, where they will not take up any of the top cart space. Also, since my collapsible container is intended to be re-usable, though concededly not forever in order to keep material and construction costs reasonable, the compact and self-containable collapsible features further the end of providing a collapsible container for compactly storing several collapsible containers when they are not in use in either a vertical or a horizontal stored position.

Additionally, my collapsible container can be constructed from a unitary blank of sheet material which provides a number of advantages over the prior art. One such advantage is an economical construction easy to assemble and having enhanced durability due to the unitary construction as well as my unique non-interlocking double layered base. The non-interlocking base of double layer construction where pairs of opposed end flaps and side flaps fold in towards each other, one on top of the other with each pair substantially spanning the perimeter of the base, provided a double layered durable construction without compromising the unique collapsibility features of my invention.

These and other types of collapsible container features are not disclosed in the prior art to provide the flexibility and inventive features of my Re-usable Compact Self-Containable Collapsible Container. As will be described in greater detail hereinafter, the features and combination of features of the present invention differ from those previously proposed.

SUMMARY OF THE INVENTION

According to my present invention I have provided a re-usable compact self-containable collapsible container preferably sized for a fitted relationship in a standard push-type shopping cart in combination with two other such collapsible containers. The collapsible container comprises a substantially rectangular base and four substantially rectangular walls having parallel sides and parallel ends. The parallel sides are foldably joined to a perimeter of the base opposite each other, and also, the parallel ends are foldably joined to the perimeter of the base opposite each other. Each parallel side is foldably joined end-to-end with adjacent parallel ends and each parallel end is foldably joined endto-end with adjacent parallel sides. Each parallel side is foldably divided into three segments along lines extending approximately a 45 degree angle from a corner toward approximately a center of the parallel side. The three segments comprise a center segment foldably joined to two outer segments where an outer segment base length is approximately equal to one-half of a center segment base length thereby enabling the two outer segments to be foldable over onto the center segment without overlapping each other. The parallel sides and ends cooperatively form an open mouth of the container substantially co-extensive with the perimeter of the base when the container is in an expanded position. To position the collapsible container into a collapsed position, a first side of the parallel sides is foldable inwardly toward a second side of the parallel sides where the first side of the parallel sides is thereby positioned over the second side of the parallel sides with both first and second sides being positionable over the base. The parallel ends are then foldable inwardly toward each other over the parallel sides and over the base without overlapping each other. Finally, each parallel side and end is substantially parallel to each other parallel side and end and the base and the parallel sides and ends are substantially contained within the perimeter of the base when the container is in a collapsed position.

Another feature of my invention relates to the a unitary blank of flexible sheet material for forming the re-usable compact self-containable collapsible container. The blank includes four substantially rectangular walls. Each rectangular wall has an upper portion and a lower portion foldably joined together along a hinge line. A slit separates each lower portion that is adjacent to another lower portion, where the slit extends through the hinge line and up to the upper portion. The upper portion of each rectangular wall has a first end foldably joined to a first side, the first side foldably joined to a second end, the second end foldably joined to a second side and the second side foldably joinable to the first end. A securing flange is located adjacent an edge of the second side and the securing flange is adapted to foldably join the second side to the first end when the collapsible container is in an assembled condition. A non-interlocking double layered base is formed when the second side is foldably joined to the first end by the following configuration. A first leading edge of the lower portion of the first end being located adjacent a second leading edge of the lower portion of the second end with each lower portion substantially co-planar to the other. A third leading edge of the lower portion of the first side being located adjacent a fourth leading edge of the lower portion of the second side with each lower portion substantially co-planar to the other. In this way, the lower portion of each first and second side define a first plane substantially co-extensive with a perimeter of the base underlying a second plane substantially co-extensive with a perimeter of the base defined by the lower portion of each first and second end, and thereby, the only interaction between the lower portions of the first and second sides and ends comprise a bottom surface of the lower portion of the first and second ends being securable to a top surface of the lower portion of the first and second sides when the collapsible container is in the assembled condition. The first and second sides are foldably divided into three segments along lines extending approximately a 45 degree angle from a corner toward approximately a center of the respective sides. The three segments comprise a center segment foldably joined to two outer segments where an outer segment base length is approximately equal to one-half of a center segment base length thereby enabling the two outer segments to be foldable over onto the center segment without overlapping each other. The sides and ends cooperatively form an open mouth of the container substantially co-extensive with a perimeter of the base when the container is in an expanded position. The first side is foldable inwardly toward the second side where the first side is positionable over the second side and over the base, the ends being foldable inwardly toward each other over the sides and over the base without overlapping each other, each side and end being substantially parallel to each other side and end and the base, and the sides and ends being substantially contained within the perimeter of the base when the container is in a collapsed position.

Still another feature of my invention concerns the unitary blank or collapsible container wherein an aperture extends through an upper part of each first and second end thereby forming a handle for carrying the collapsible container when it is in the assembled condition and in the expanded position and where further a reinforcing flap is located adjacent an upper portion of the aperture and is located between the upper portion of the aperture and an upper edge of each end. In one embodiment of my invention the reinforcing flap is also foldably joined to the upper edge of each first and second end.

According to important features of my invention I have also provided the unitary blank wherein the lower portion of each first and second end has a first length greater than a second length of the lower portion of each first and second side.

Yet another feature of my invention I have provided is the unitary blank or collapsible container wherein the upper portion foldably joined to respective lower portions and/or respective sides foldably joined to adjacent ends and/or respective ends foldably joined to adjacent sides and/or each side foldably divided into three segments, are joined along respective double-jointed hinges, the double-jointed hinges further enabling the container to maintain a flat stackable position when the collapsible container is in the collapsed position.

Still another feature of my invention concerns the unitary blank or collapsible container sized enabling a first matched set of three collapsible containers, each in the expanded position, to be positioned inside a standard push-type shopping cart in a frictional wall-to-wall relationship with one another and the shopping cart thereby substantially covering a bottom basket portion of the shopping cart. It is further preferred that the collapsible container be sized enabling a second match set of three collapsible containers, each in the expanded position, to be positioned inside the standard push-type shopping cart on top of the first matched set of three collapsible containers therein, and further, the second matched set of three collapsible containers being positioned inside the shopping cart in a second frictional wall-to-wall relationship with one another and the shopping cart thereby substantially covering the first matched set of three collapsible containers.

Other objects, features and advantages of my invention will become more readily apparent upon reference to the following description when taken in conjunction with the accompanying drawings, which drawings illustrate several embodiments of my invention.

DESCRIPTION OF THE DRAWINGS

FIG. 4 is a top view of a unitary blank of flexible material used to construct the preferred embodiment of my re-usable compact self-containable collapsible container in FIG. 1a.;

FIG. 6b is a partial top view of the cart shown in FIG. 6a;

DETAILED DESCRIPTION OF THE PREFERRED EMBODIMENT

Referring now to the drawings, FIGS. 1a–1d, 2 and 3 depict my new and improved re-usable compact self-containable collapsible container 12. The container 12 has a substantially rectangular base 120 defined by a perimeter 72. Foldable joined to the perimeter 72 of the base 120 are four substantially rectangular walls having parallel sides 122 and parallel ends 124. The sides 122 are foldably joined to the perimeter of the base opposite each other as are the ends 124 foldably joined to the perimeter of the base opposite each other. Further, each parallel side 122 is foldably joined end-to-end with an adjacent parallel end 124, and likewise, each parallel end 124 is foldably joined end-to-end with an adjacent parallel side 122.

Each parallel side 122 is foldably divided into three segments along lines 56 extending at approximately a 45 degree angle from a corner 58 toward approximately a center 60 of each parallel side 122. The three segments comprise a center segment 62 foldably joined to two outer segments 64. The outer segments 64 each have an outer segment base length 66 that is approximately equal to one-half of a center segment base length 68 of the center segment 62. With these approximate proportions, the critical relationship of the base lengths 66 and 68 enable the two outer segments 64 to be foldable over onto the center segment 62 without overlapping each other. In this way, the design of my container 12 maximizes the expanded position carrying capacity of my container 12 while simultaneously enabling the container to maintain a flat stackable position when the container is in the collapsed position.

Figure 1A:
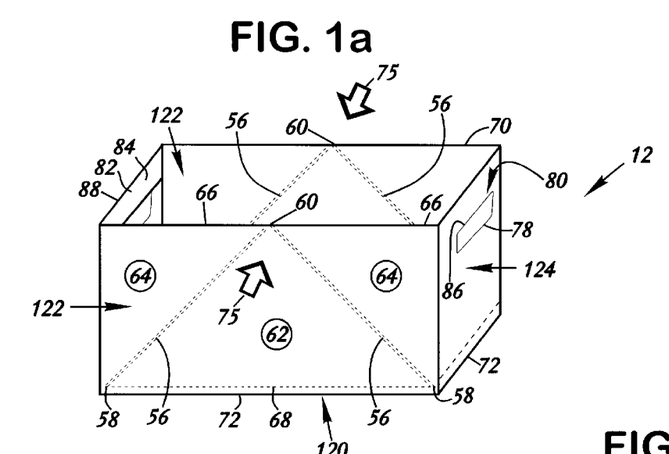
FIG. 1a is a perspective view of the preferred embodiment of my re-usable compact self-containable collapsible container in an assembled condition and in an expanded position.
Figure 1B:
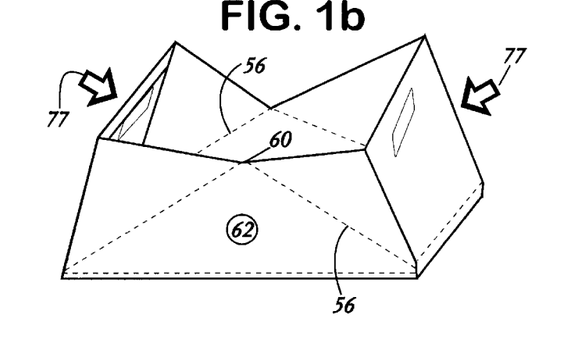
FIG. 1b is a view of the container in FIG. 1a only not in an expanded position and being moved towards a collapsed position.
Figure 1C:
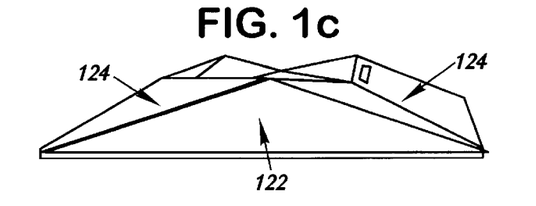
FIG. 1c is a view of the container in FIG. 1a only not in an expanded position and being moved further towards the collapsed position.
Figure 1D:
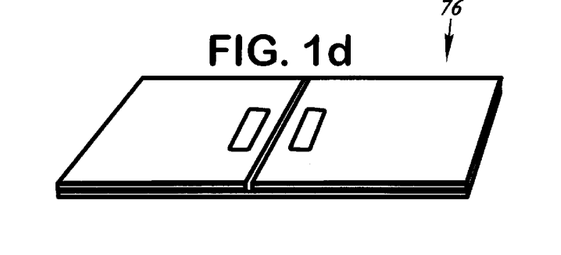
FIG. 1d is a view of the container in FIG. 1a only not in an expanded position and now in the collapsed position.
Figure 2:
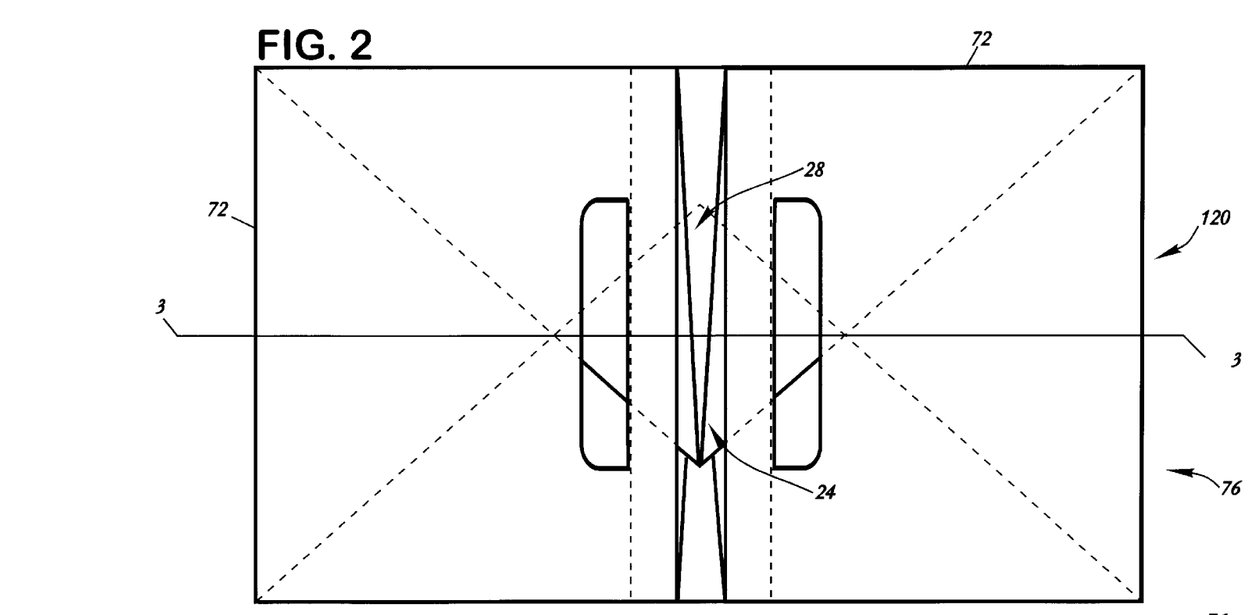
FIG. 2 is a top view of the container in FIG. 1d.
Figure 3:
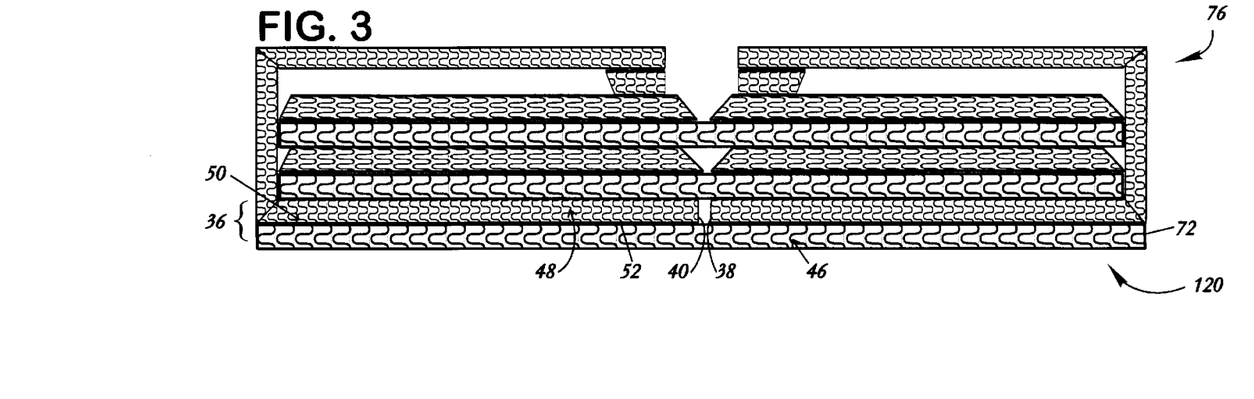
FIG. 3 is a sectional view along the line 3—3 of the container in FIG. 2.

As seen in FIGS. 1a through 1d, the container 12 is progressively positionable from an expanded position (FIG. 1a) to a collapsed position (FIG. 1d). To attain the collapsed position first a slight sidewise inward force 75 is applied to the sides 122 to commence the collapsing process. Then, all force for closing the container 12 is moved to the ends 124 in the form of an endwise inward force 77.

Hereafter, my container is structured such that a first side 24 of the parallel sides 122 is foldable inwardly toward a second side 28 of the parallel sides 122. The first side 24 is positioned over the second side 28 and both of the first and second sides are positioned over the base 120. Simultaneously, the parallel ends 124 are folded inwardly toward each other over the sides 122 and over the base without overlapping each other. In the fully collapsed position 76, each parallel side 122 and end 124 is substantially parallel to each other parallel side and end and the base.

Figure 5A:
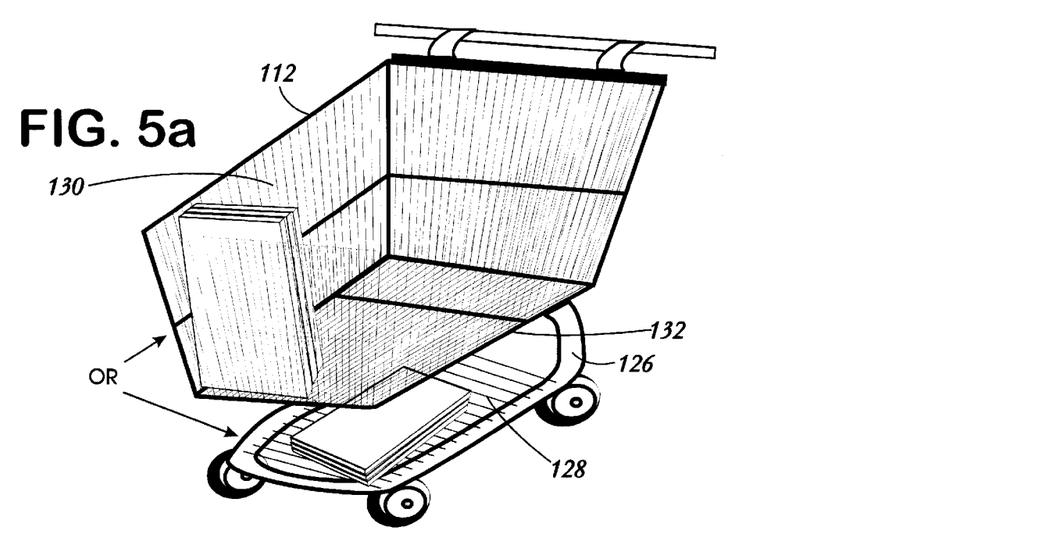
FIG. 5a is a perspective view of six of the containers like those in FIG. 2, the six containers in combination with a standard push-type shopping cart.
Figure 5B:
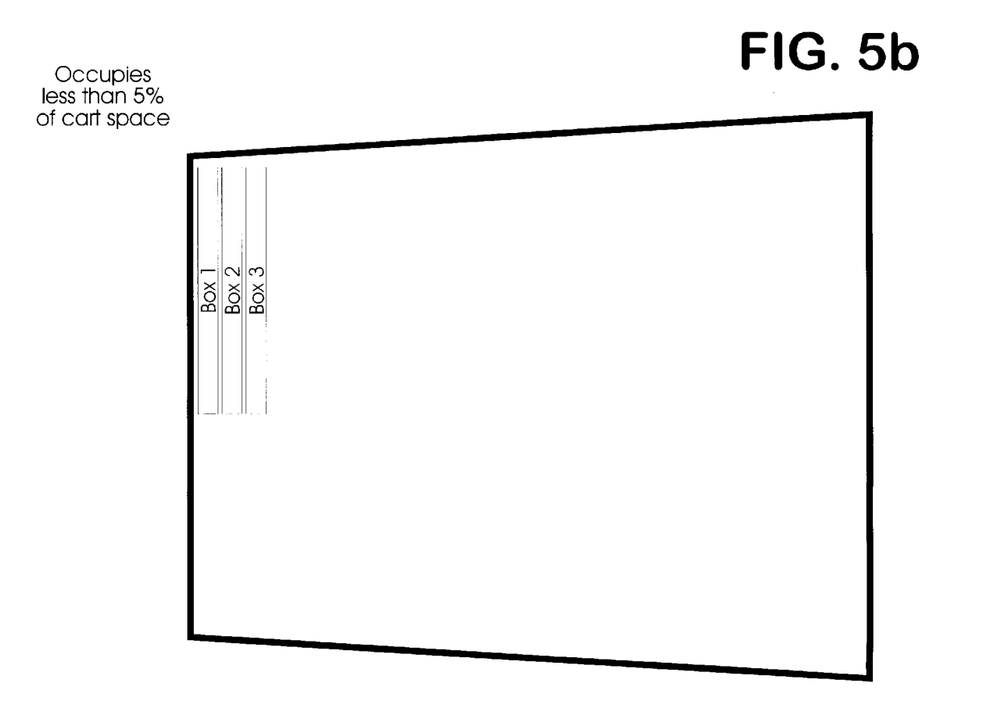
FIG. 5b is a partial top view of the cart shown in FIG. 5a with my containers shown in a collapsed upright supported position.
Figure 6A:
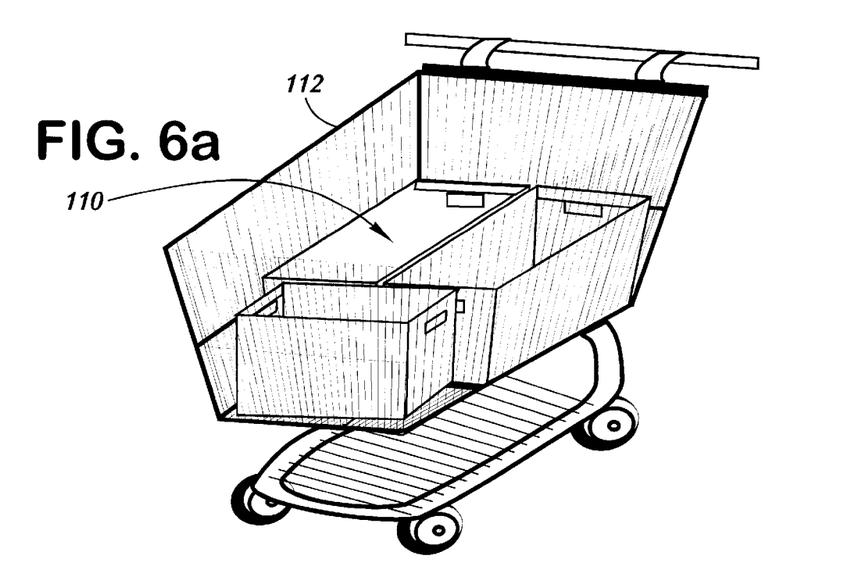
FIG. 6a is a perspective view of three containers like those in FIG. 1a, now shown supported in a supported position on a bottom basket portion.
Figure 6B:
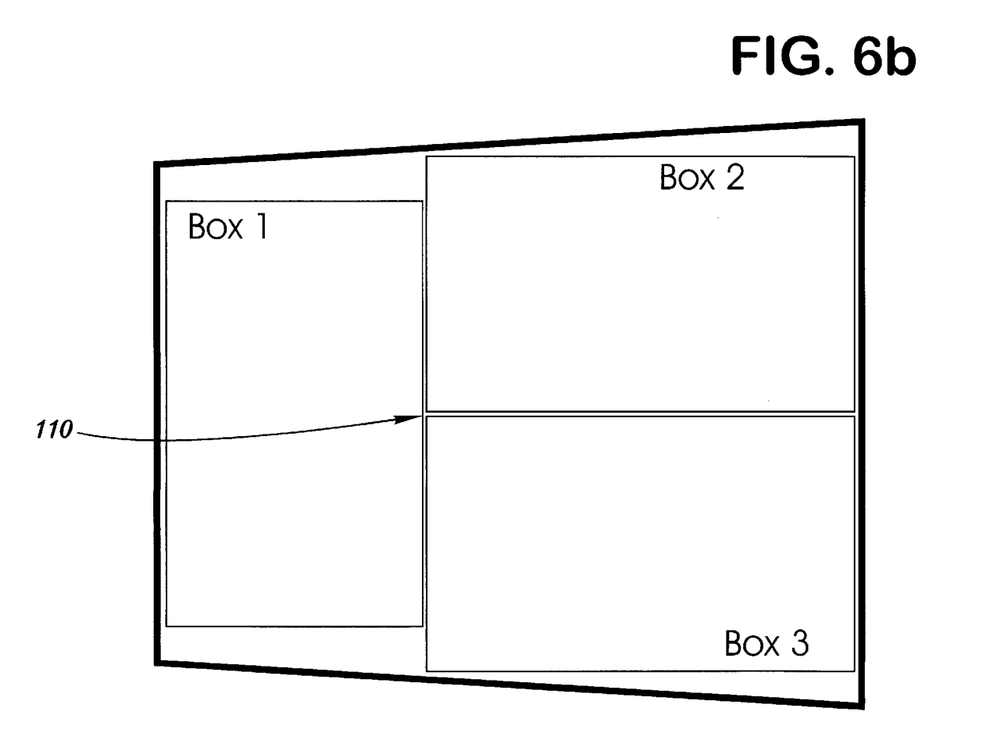
Figure 7A:
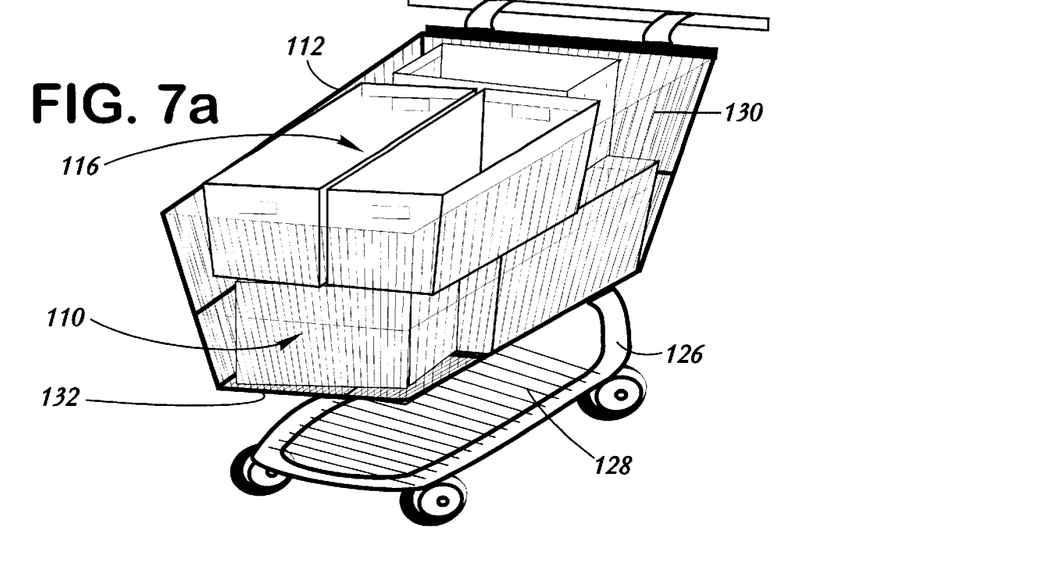
FIG. 7a is a perspective view of a second three containers like those in FIG. 1a, the second three containers on top of the first three containers shown in FIG. 6a; and, FIG. 7b is a partial top view of the cart shown in FIG. 7a with the first three containers comprising BOX 1, 2, and 3 shown in dotted lines and the second three containers comprising BOX 4, 5, and 6 shown in solid lines.
Figure 7B:
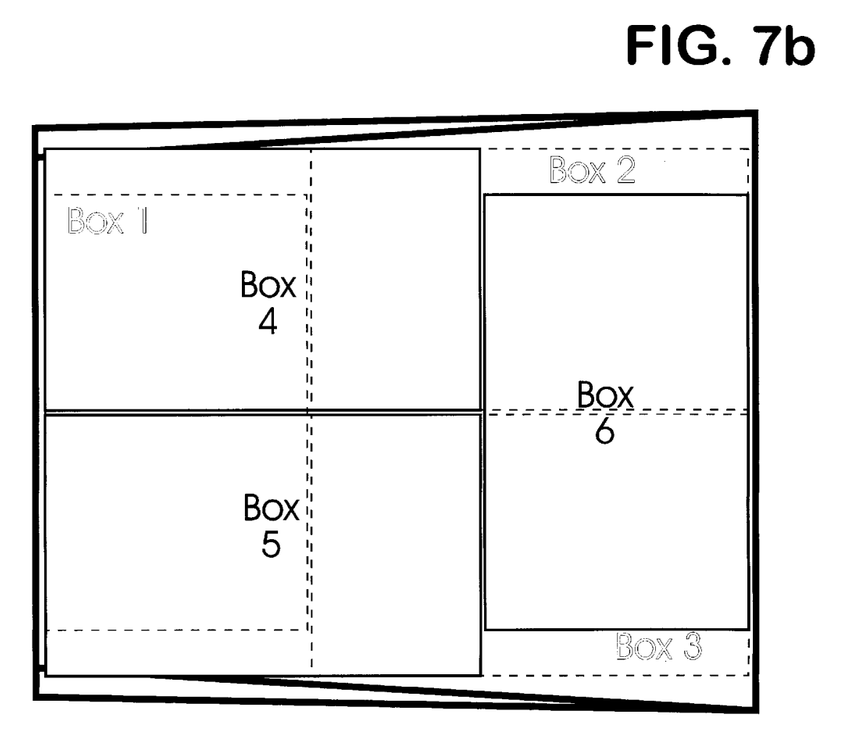

According to certain features of my invention, the parallel sides and ends are substantially contained within the perimeter of the base when the container is in the collapsed position, as shown in FIGS. 5a and 5b. In this way, my container will more consistently and compactly maintain a flat stackable position when in the collapsed position thereby enabling one container to be stacked next to another inside a standard push-type shopping cart 112 without taking up much of the valuable shopping cart space that is need for groceries. The shopping cart 112 comprises a wheeled frame 126, a bottom rack 128, a top basket 130 where the top basket has inside it bottom basket portion 132. For example, in one such shopping cart that I have experimented with, three collapsed containers, as seen in FIGS. 5a and 5b, occupy less than 5% of the overall top cart space and can be placed on a bottom rack of the cart, if desired, where they will not take up any of the top cart space.

These steps are followed in reverse order when one desires to modify the container from the collapsed position to the expanded position, with the first step being to exert an outward endwise force, opposite that of force 77, on the ends 124 of the container. Then, when the container is in the expanded position, the parallel sides 122 and ends 124 cooperatively form an open mouth 70 of the container. The mouth 70 is substantially co-extensive with the perimeter 72 of the base. This is yet another critical feature of my container for two reasons. First, in this way the configuration of my container maximizes the carrying capacity of my container 12 while simultaneously enabling the container to maintain a flat stackable position when the container is in the collapsed position. Second, in this way the configuration of my container also enables a number of the containers to be positioned inside the shopping cart 112 in a frictional wall-to-wall relationship thereby maximizing the storage capacity of the containers in the shopping cart with the fewest number of easily transportable collapsible containers.

In a preferred embodiment of my invention (FIGS. 6a, 6b 7a and 7b) my collapsible container 12 is size to enable a first matched set 110 of three collapsible containers, each in the expanded position, to be positioned inside the shopping cart 112 in frictional wall-to-wall relationship with one another and the shopping cart thereby substantially covering the bottom basket portion 132 of the shopping cart. Additionally, the collapsible container is sized to enable a second matched set 116 of three collapsible containers, each in the expanded position, to be positioned inside the shopping cart on top of the first three collapsible containers therein. The second matched set of three collapsible containers positioned inside the shopping cart would be in a second frictional wall-to-wall relationship with one another and the shopping cart, similar to the first frictional wall-to-wall relationship, thereby substantially covering the first matched set of three collapsible containers.

Figure 4:
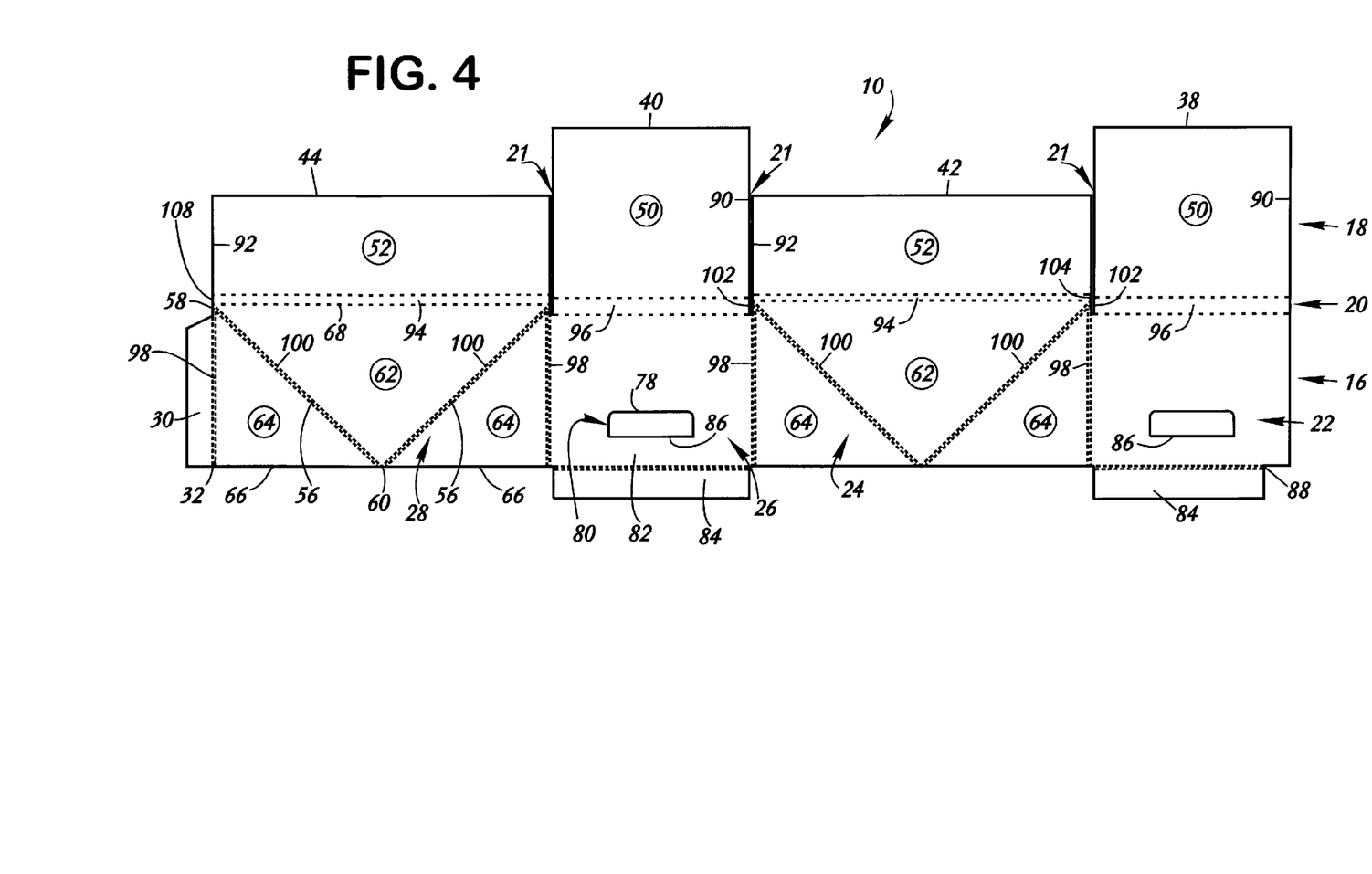

Referring now to FIG. 4, my collapsible container 12 is preferably constructed from a unitary blank of flexible sheet material 10. The blank includes four substantially rectangular walls, each rectangular wall has an upper portion 16 and a lower portion 18 being foldably joined together along a hinge line 20. A slit 21 separates each lower portion that is adjacent to another lower portion and the slit extends through the hinge line 20 up to the upper portion 16. Having the slit 21 extend through the hinge line 20 further enables the container to more consistently and easily maintain a flat stackable position when the container is in the collapsed position.

The upper portion of each rectangular wall has a first end 22 foldably joined to a first side 24. The first side 24 is foldably joined to a second end 26. The second end 26 is foldably joined to a second side 28. Then, the second side 28 is foldably joinable to the first end 22 by a securing flange 30 adjacent an edge 32 of the second side. The securing flange 30 is adapted to foldably join the second side 28 to the first end 22 when the collapsible container is in an assembled condition, as seen in all FIGS. but FIG. 4.

In assembling my container 12, a non-interlocking double layered base structure 36 is formable after the second side 28 is foldably joined to the first end 22. To form the base structure 36, a first leading edge 38 of the lower portion of the first end 22 is moved into adjacency to a second leading edge 40 of the lower portion of the second end 26, where each lower portion is thereby substantially co-planar to the other. Next, a third leading edge 42 of the lower portion of the first side 24 is moved into adjacency to a fourth leading edge 44 of the lower portion of the second side 28, where each lower portion is thereby substantially co-planar to the other. With the leading edges 38, 40, 42 and 44 so positioned, the lower portion of each first and second side 24 and 28 defines a first plane 46 (FIG. 4) substantially co-extensive with a perimeter of the base and being substantially perpendicular to the sides and ends. Finally, the lower portion of each first and second end 22 and 26 defines a second plane 48 (FIG. 4), which is also substantially co-extensive with a perimeter of the base and being substantially perpendicular to the sides and ends, where the second plane 48 overlies the first plane 46.

Together, the first and second planes comprise the non-interlocking double layered base structure 36. This is a further feature of my collapsible container that enhances simple assembly, durability and compact collapsibility of my container for storage purposes due to the minimal interaction between the two layers of the double layered base. More specifically, the only interaction between the lower portions of the first and second sides and ends, namely the first and second planes, is a bottom surface 50 of the lower portion of the first and second ends being securable to a top surface 52 of the lower portion of the first and second sides when the collapsible container is in the assembled condition. The bottom surface 50 is preferably secured to the top surface 52 by glue, although it should be understood that any other suitable form of securing means such as staples, other bonding agents, or the like could be used and the claimed features of my invention would still be embraced by such a construction.

In the preferred embodiment of my invention, to enhance durability and distribution of load forces, the lower portion of each first and second end has a first length 90 greater than a second length 92 of the lower portion of each first and second side. In this way, the first and second planes comprising the double layered base adequately complement each other to ensure a sturdy and durable base structure 36 (FIG. 4). Further towards these ends, it is preferred that the first length 90 be approximately equal for each lower portion of each first and second end, and that, the second length 92 be approximately equal for each lower portion of each first and second side.

In an assembled condition and in the expanded position, the collapsible container 12 contains an aperture 78 extending through an upper part 80 of each first and second end 22 and 26. In this way, the aperture 78 forms a handle 82 for carrying the collapsible container when it is in the assembled condition. Further, a reinforcing flap 84 is located adjacent an upper portion 86 of the aperture 78 and located between the upper portion 86 of the aperture and an upper edge 88 of each end 22 and 26. In the preferred embodiment of my invention the reinforcing flap 84 is foldably joined to the upper edge of each first and second end 22 and 26. Moreover, excellent results are obtained when the flap 84 is secured to the ends 22 and 26 by glue or a glue like securing agent, thereby providing increased strength to the handle 82 for carrying the collapsible container when it is filled with groceries or the like.

In the preferred embodiment of my invention, which maximizes the collapsibility features as well as includes the other features of my invention, the collapsible container 12 will have one or more of the following "double-jointed" hinges, and preferably all four "double-jointed" hinges, as hereafter described. The upper portion 16 of each first and second side 24 and 28 which is foldably joined to respective lower portions 18 along the hinge line 20 is joined along a first double-jointed hinge 94, the first double-jointed hinge further enabling the container to maintain a flat stackable position when the collapsible container is in the collapsed position. Additionally, the upper portion of each first and second end 22 and 26 which is foldably joined to respective lower portions along the hinge line is joined along a second double-jointed hinge 96, the second double-jointed hinge also further enabling the container to maintain a flat stackable position when the collapsible container is in the collapsed position. Further, where the first end 22 is foldably joined to the first side 24, the first side 24 foldably joined to the second end 26, the second end 26 foldably joined to the second side 28 and the second side 28 foldably joinable to the first end 22, are each joined along a third double-jointed hinge 98, the third double-jointed hinge also further enabling the container to maintain a flat stackable position when the collapsible container is in the collapsed position. Finally, each first and second side 24 and 28 foldably divided into three segments is foldably divided along a fourth double-jointed hinge 100, the fourth double-jointed hinge also further enabling the container to maintain a flat stackable position when the collapsible container is in the collapsed position.

Yet further towards the end of enhancing the collapsibility of my collapsible container 12, I have provided the second double-jointed hinge 96 having a second hinge width 102 wider than a first hinge width 104 of the first double-jointed hinge 94, thereby further enabling the container to maintain a flat stackable position when the collapsible container is in the collapsed position and particularly when the parallel sides are folded in and under the parallel ends. Then, I have provided the third and fourth double-jointed hinges 98 and 100 with a third hinge width narrower than the first hinge width 104 and the second hinge width 102, thereby further enabling the container to maintain a flat stackable position when the collapsible container is in the collapsed position and particularly when the parallel sides are folded in and under the parallel ends. Finally, I have provided the first double-jointed hinge 94 of the first side 24 having a fourth hinge width 108 wider than the first hinge width 104 of the second side 28, thereby further enabling the container to maintain a flat stackable position when the collapsible container is in the collapsed position and particularly when the parallel sides are folded in and under the parallel ends.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. In a standard push-type shopping cart structure including a wheeled frame, a bottom rack, a top basket, and the top basket having a bottom basket portion, the improvement comprising: a re-usable compact self-containable collapsible container sized to enable a first matched set of three collapsible containers, each in an expanded position, to be positioned inside the standard push-type shopping cart in a frictional wall-to-wall relationship with one another and the shopping cart thereby substantially covering the bottom basket portion of the shopping cart; the re-usable compact self-containable collapsible container comprising a substantially rectangular base and four substantially rectangular walls having parallel sides and parallel ends; the parallel sides being foldably joined to a perimeter of the base opposite each other and the parallel ends being foldably joined to the perimeter of the base opposite each other, each parallel side being foldably joined end-to-end with adjacent parallel ends and each parallel end being foldably joined end-to-end with adjacent parallel sides; each parallel side being foldably divided into three segments along lines extending approximately a 45 degree angle from a corner toward approximately a center of the parallel side, the three segments comprising a center segment foldably joined to two outer segments where an outer segment base length is approximately equal to one-half of a center segment base length thereby enabling the two outer segments to be foldable over onto the center segment without overlapping each other; the parallel sides and ends cooperatively forming an open mouth of the container substantially co-extensive with the perimeter of the base when the container is in an expanded position; a first side of the parallel sides being foldable inwardly toward a second side of the parallel sides where the first side of the parallel sides is positionable over the second side of the parallel sides with both first and second sides being positionable over the base, the parallel ends being foldable inwardly toward each other over the parallel sides and over the base without overlapping each other, each parallel side and end being substantially parallel to each other parallel side and end and the base, and the parallel sides and ends being substantially contained within the perimeter of the base when the container is in a collapsed position; and, an aperture extending through an upper part of each parallel end thereby forming a handle for carrying the collapsible container when it is in the expanded position and where further a reinforcing flap is located adjacent an upper portion of the aperture and being located between the upper portion of the aperture and an upper edge of each parallel end.

2. The shopping cart structure of claim 1, wherein the collapsible container is sized enabling a second matched set of three collapsible containers, each in the expanded position, to be positioned inside the standard push-type shopping cart on top of the first matched set of three collapsible containers therein, and further, the second matched set of three collapsible containers being positioned inside the shopping cart in a second frictional wall-to-wall relationship with one another and the shopping cart thereby substantially covering the first matched set of three collapsible containers.

3. The shopping cart structure of claim 2, wherein the parallel sides which are foldably joined to a perimeter of the base opposite each other are joined to the base along a first double-jointed hinge, the parallel ends which are foldably joined to a perimeter of the base opposite each other are joined to the base along a second double-jointed hinge, each parallel side being foldably joined end-to-end with adjacent parallel ends and each parallel end being foldably joined end-to-end with adjacent parallel sides are joined to each other along a third double-jointed hinge, the first, second and third double-jointed hinges each enabling the container to maintain a flat stackable position when the collapsible container is in the collapsed position.

4. The shopping cart structure of claim 3, wherein each parallel side being foldably divided into three segments is foldably divided along a fourth double-jointed hinge, the fourth double-jointed hinge enabling the container to maintain a flat stackable position when the collapsible container is in the collapsed position.

5. A unitary blank of flexible sheet material for forming a re-usable compact self-containable collapsible container; the blank including four substantially rectangular walls; each rectangular wall having an upper portion and a lower portion being foldably joined together along a hinge line; a slit separating each lower portion that is adjacent another lower portion, where the slit extends through the hinge line and up to the upper portion; the upper portion of each rectangular wall having a first end being foldably joined to a first side, the first side being foldably joined to a second end, the second end being foldably joined to a second side and the second side being foldably joinable to the first end; a securing flange adjacent an edge of the second side, the securing flange adapted to foldably join the second side to the first end when the collapsible container is in an assembled condition; a non-interlocking double layered base formable when the second side is foldably joined to the first end, a first leading edge of the lower portion of the first end being located adjacent a second leading edge of the lower portion of the second end with each lower portion substantially co-planar to the other, a third leading edge of the lower portion of the first side being located adjacent a fourth leading edge of the lower portion of the second side with each lower portion substantially co-planar to the other, and the lower portion of each first and second side defining a first plane substantially co-extensive with a perimeter of the base underlying a second plane substantially co-extensive with a perimeter of the base defined by the lower portion of each first and second end, and whereby the only interaction between the lower portions of the first and second sides and ends comprises a bottom surface of the lower portion of the first and second ends being securable to a top surface of the lower portion of the first and second sides when the collapsible container is in the assembled condition; the first and second sides each being foldably divided into three segments along lines extending approximately a 45 degree angle from a corner toward approximately a center of the respective sides, the three segments comprising a center segment foldably joined to two outer segments where an outer segment base length is approximately equal to one-half of a center segment base length thereby enabling the two outer segments to be foldable over onto the center segment without overlapping each other; the sides and ends cooperatively forming an open mouth of the container substantially co-extensive with a perimeter of the base when the container is in an expanded position; and, the first side being foldable inwardly toward the second side where the first side is positionable over the second side and over the base, the ends being foldable inwardly toward each other over the sides and over the base without overlapping each other, each side and end being substantially parallel to each other side and end and the base, and the sides and ends being substantially contained within the perimeter of the base when the container is in a collapsed position.

6. The unitary blank of claim 5, wherein an aperture extends through an upper part of each first and second end thereby forming a handle for carrying the collapsible container when it is in the assembled condition and where further a reinforcing flap is located adjacent an upper portion of the aperture and being located between the upper portion of the aperture and an upper edge of each end.

7. The unitary blank of claim 6, wherein the reinforcing flap is foldably joined to the upper edge of each first and second end.

8. The unitary blank of claim 5, wherein the lower portion of each first and second end has a first length greater than a second length of the lower portion of each first and second side.

9. The unitary blank of claim 5, wherein the upper portion of each first and second side which is foldably joined to respective lower portions along the hinge line is joined along a first double-jointed hinge, the first double-jointed hinge enabling the container to maintain a flat stackable position when the collapsible container is in the collapsed position.

10. The unitary blank of claim 9, wherein the upper portion of each first and second end which is foldably joined to respective lower portions along the hinge line is joined along a second double-jointed hinge, the second double-jointed hinge enabling the container to maintain a flat stackable position when the collapsible container is in the collapsed position.

11. The unitary blank of claim 10, wherein the first end being foldably joined to the first side, the first side being foldably joined to the second end, the second end being foldably joined to the second side and the second side being foldably joinable to the first end are each joined along a third double-jointed hinge, the third double-jointed hinge enabling the container to maintain a flat stackable position when the collapsible container is in the collapsed position.

12. The unitary blank of claim 11, wherein each first and second side being foldably divided into three segments is foldably divided along a fourth double-jointed hinge, the fourth double-jointed hinge enabling the container to maintain a flat stackable position when the collapsible container is in the collapsed position.

13. The unitary blank of claim 12, wherein the second double-jointed hinge has a second hinge width wider than a first hinge width of the first double-jointed hinge, thereby further enabling the container to maintain a flat stackable position when the collapsible container is in the collapsed position and particularly when the parallel sides are folded in and under the parallel ends.

14. The unitary blank of claim 13, wherein the third and fourth double-jointed hinges have a third hinge width narrower than the first hinge width and the second hinge width, thereby further enabling the container to maintain a flat stackable position when the collapsible container is in the collapsed position and particularly when the parallel sides are folded in and under the parallel ends.

15. The unitary blank of claim 14, wherein the first double-jointed hinge of the first side has a fourth hinge width wider than the first hinge width of the second side, thereby further enabling the container to maintain a flat stackable position when the collapsible container is in the collapsed position and particularly when the parallel sides are folded in and under the parallel ends.

16. The unitary blank of claim 15, wherein the collapsible container is sized enabling a first matched set of three collapsible containers, each in the expanded position, to be positioned inside a standard push-type shopping cart in a frictional wall-to-wall relationship with one another and the shopping cart thereby substantially covering a bottom basket portion of the shopping cart.

17. A re-usable compact self-containable collapsible container comprising a substantially rectangular base and four substantially rectangular walls having parallel sides and parallel ends; the parallel sides being foldably joined to a perimeter of the base opposite each other and the parallel ends being foldably joined to the perimeter of the base opposite each other, each parallel side being foldably joined end-to-end with adjacent parallel ends and each parallel end being foldably joined end-to-end with adjacent parallel sides; each parallel side being foldably divided into three segments along lines extending approximately a 45 degree angle from a corner toward approximately a center of the parallel side, the three segments comprising a center segment foldably joined to two outer segments where an outer segment base length is approximately equal to one-half of a center segment base length thereby enabling the two outer segments to be foldable over onto the center segment without overlapping each other; the parallel sides and ends cooperatively forming an open mouth of the container substantially co-extensive with the perimeter of the base when the container is in an expanded position; a first side of the parallel sides being foldable inwardly toward a second side of the parallel sides where the first side of the parallel sides is positionable over the second side of the parallel sides with both first and second sides being positionable over the base, the parallel ends being foldable inwardly toward each other over the parallel sides and over the base without overlapping each other, each parallel side and end being substantially parallel to each other parallel side and end and the base, and the parallel sides and ends being substantially contained within the perimeter of the base when the container is in a collapsed position; and, an aperture extends through an upper part of each parallel end thereby forming a handle for carrying the collapsible container when it is in the expanded position and where further a reinforcing flap is located adjacent an upper portion of the aperture and being located between the upper portion of the aperture and an upper edge of each parallel end.

18. The collapsible container of claim 17, wherein the parallel sides which are foldably joined to a perimeter of the base opposite each other are joined to the base along a first double-jointed hinge, the parallel ends which are foldably joined to a perimeter of the base opposite each other are joined to the base along a second double-jointed hinge, each parallel side being foldably joined end-to-end with adjacent parallel ends and each parallel end being foldably joined end-to-end with adjacent parallel sides are joined to each other along a third double-jointed hinge, each parallel side being foldably divided into three segments is foldably divided along a fourth double-jointed hinge, the first, second, third and fourth double-jointed hinge each enabling the container to maintain a flat stackable position when the collapsible container is in the collapsed position.

19. The collapsible container of claim 18, wherein the collapsible container is sized enabling a first matched set of three collapsible containers, each in the expanded position, to be positioned inside a standard push-type shopping cart in a frictional wall-to-wall relationship with one another and the shopping cart thereby substantially covering the bottom basket portion of the shopping cart.

20. The collapsible container of claim 19, wherein the collapsible container is sized enabling a second matched set of three collapsible containers, each in the expanded position, to be positioned inside the standard push-type shopping cart on top of the first match set of three collapsible containers therein, and further, the second matched set of three collapsible containers being positioned inside the shopping cart in a second frictional wall-to-wall relationship with one another and the shopping cart thereby substantially covering the first matched set of three collapsible containers.

\* \* \* \* \*